US008242952B1
::::

(12) United States Patent  (10) Patent No.: US 8,242,952 B1
Barr  (45) Date of Patent: Aug. 14, 2012

(54) ELIMINATION OF SPURIOUS DATA IN RADAR CROSS-SECTION CALCULATIONS AND MEASUREMENTS

(75) Inventor: Samuel Allan Barr, Madison, AL (US)

(73) Assignee: The Boeing Company, Chicago, IL (US)

( * ) Notice: Subject to any disclaimer, the term of this patent is extended or adjusted under 35 U.S.C. 154(b) by 383 days.

(21) Appl. No.: 12/694,721

(22) Filed: Jan. 27, 2010

(51) Int. Cl.
*G01S 7/292* (2006.01)
*G01S 13/88* (2006.01)

(52) U.S. Cl. ............ 342/90; 342/22; 342/27; 342/54; 342/55; 342/57; 342/58; 342/159; 342/195

(58) Field of Classification Search ............ 342/22, 342/27, 54–58, 90, 159, 192, 195
See application file for complete search history.

(56) References Cited

U.S. PATENT DOCUMENTS

| | | | | |
|---|---|---|---|---|
| 4,034,373 | A * | 7/1977 | de Pierre et al. | 342/100 |
| 5,005,147 | A * | 4/1991 | Krishen et al. | 703/13 |
| 5,235,338 | A * | 8/1993 | Hsiao et al. | 342/109 |
| 5,394,157 | A * | 2/1995 | Garneski | 342/360 |
| 5,534,873 | A * | 7/1996 | Weichman et al. | 342/165 |
| 5,745,071 | A | 4/1998 | Blackmon | |
| 5,818,383 | A * | 10/1998 | Stockburger et al. | 342/109 |
| 5,821,896 | A * | 10/1998 | Nakano et al. | 342/90 |
| 5,945,940 | A * | 8/1999 | Cuomo | 342/90 |
| 8,044,838 | B1 * | 10/2011 | Barr et al. | 342/22 |
| 2011/0298654 | A1 * | 12/2011 | Hellsten | 342/25 A |
| 2012/0062407 | A1 * | 3/2012 | O'Donnell et al. | 342/22 |

FOREIGN PATENT DOCUMENTS

EP 565047 A1 * 10/1993

OTHER PUBLICATIONS

Carriere, R., and Moses, R., "High Resolution Radar Target Modeling Using a Modified Prony Estimator" IEEE Transactions on Antennas and Propagation; 40:13-18 (1992).
Pierson et al., "Accuracy and computational comparisons of TLS-Prony, Burg, and FFT-based scattering center extraction algorithms" SPIE Automatic Object Recognition III Conference, Orlando, FL, Apr. 11-14, 1993.
Pierson, W., "Comparisons of Scattering Center Extraction Algorithms" Thesis Presented in Partial Fulfillment of the Requirement for the Degree Master of Science in the Graduate School of the Ohio State University (1993).

* cited by examiner

*Primary Examiner* — John B Sotomayor
(74) *Attorney, Agent, or Firm* — John A. Lepore

(57) ABSTRACT

Presented is a system and method for eliminating spurious data in radar cross section (RCS) data. The system and method receives RCS data, and determines an expected number of scattering centers for an object of interest in said RCS data. The RCS data is processed to remove a plurality of frequency components in said RCS data based at least in part upon said expected number of scattering centers, and the RCS data is reconstructed without said plurality of frequency components to produce a reconstructed RCS data for the object of interest. In an embodiment, the TLS-Prony transform is used to transform the RCS data into a set of damped frequency components and coefficients, which are then constrained to the expected number of scattering centers in the known object using a TLS-Prong linear prediction order, and the order of the frequency components is varied until the order yields a least-error approximation.

20 Claims, 3 Drawing Sheets

ELIMINATION OF SPURIOUS DATA IN RADAR CROSS-SECTION CALCULATIONS AND MEASUREMENTS

U.S. GOVERNMENT RIGHTS

This invention was made with Government support under the Office of Naval Research Buried Mine Detection and Location program N00014-07-C-0295. The government has certain rights in this invention.

FIELD

Embodiments of the subject matter described herein relate generally to a system and method for elimination of spurious data in Radar Cross-Section (RCS) calculations and measurements.

BACKGROUND

The Radar Cross-Section (RCS) of an object of interest can be determined computationally, for example using an RCS prediction software application or empirically, for example in indoor radar ranges. Spurious data points in the computations or measurements often occur, and can be attributed to optimization of object model discretization for frequency sub-bands; discontinuities between RCS data from multiple sources, measurement error, and the presence of clutter in RCS measurements. Spurious data points adversely affect the time domain representation of the RCS data.

Spurious data points at boundaries between frequency sub-bands in calculated RCS data can be eliminated sometimes by recomputing the RCS using a model optimized for that frequency. Spurious data points due to measurement error can be eliminated sometimes by repeating measurements. However, recomputing the RCS using a differently optimized model or repeating RCS measurements is time-consuming. Depending on the model and the frequency range, RCS computations can take hundreds of hours to compute and are therefore costly. If eliminating the spurious data points is impractical or impossible, data points believed to be spurious can be ignored. However, ignoring data points can be risky, in that some true features of the object of interest may be masked.

SUMMARY

Presented is a system and method for eliminating spurious data such as noise, discontinuities, and other artifacts in Radar Cross-Section (RCS) data. In one embodiment, the system and method models RCS data using a TLS Prony method, but limits the number of poles representing point scatterers to the number of physical point scatterers of the object being modeled. In another embodiment, the system and method compares the raw RCS data to a library of objects previously modeled or identified, and limits the number of poles in the TLS Prony calculation to the number of physical point scatterers of the matching object from the library. In an embodiment the system and method is a signal processing algorithm implemented in software and running on a digital signal processor (DSP.)

The features, functions, and advantages discussed can be achieved independently in various embodiments of the present invention or may be combined in yet other embodiments further details of which can be seen with reference to the following description and drawings.

BRIEF DESCRIPTION OF THE DRAWINGS

The accompanying figures depict various embodiments of the system and method for eliminating spurious data in Radar Cross-Section (RCS) data. A brief description of each figure is provided below. Elements with the same reference number in each figure indicated identical or functionally similar elements. Additionally, the left-most digit(s) of a reference number indicate the drawing in which the reference number first appears.

DETAILED DESCRIPTION

The following detailed description is merely illustrative in nature and is not intended to limit the embodiments of the invention or the application and uses of such embodiments. Furthermore, there is no intention to be bound by any expressed or implied theory presented in the preceding technical field, background, brief summary or the following detailed description.

Eliminating spurious data in radar cross-section (RCS) calculations and measurements is generally time-consuming. Eliminating spurious data in RCS calculations typically involves recomputing the RCS using a differently optimized model. Depending on the model and the frequency range, recomputing the RCS can take hundreds of hours to compute and require access to significant computer resources. However, depending on the application there may not always be time and available computer resources to perform the additional calculations, and further it may not be cost effective to perform the additional computations. Therefore it would be advantageous to eliminate spurious data in RCS calculations without requiring recomputation of the RCS calculations.

Spurious data in RCS measurements can sometimes be eliminated by repeating measurements. However, repeating measurements not only increases the amount of time required in performing the additional measurements, but may also require the radar to maintain the same general position and orientation relative to the object of interest for multiple measurements. However, depending on the application it may not be practical to perform additional measurements. For example, if the radar is on a moving platform, it would be advantageous to eliminate spurious data in RCS measurements without requiring multiple measurements.

The system and method of the present disclosure uses information about the geometry and radar scattering properties of an object of interest to eliminate spurious RCS data. Using information about the geometry and radar scattering properties of an object to remove spurious RCS data improves the quality of RCS data and avoids system costs associated with designs based on recomputing or remeasuring. The system and method of the present disclosure also offers schedule savings, and consequently cost savings, compared to other methods of regenerating RCS data.

System Components and Operation

Figure 1:
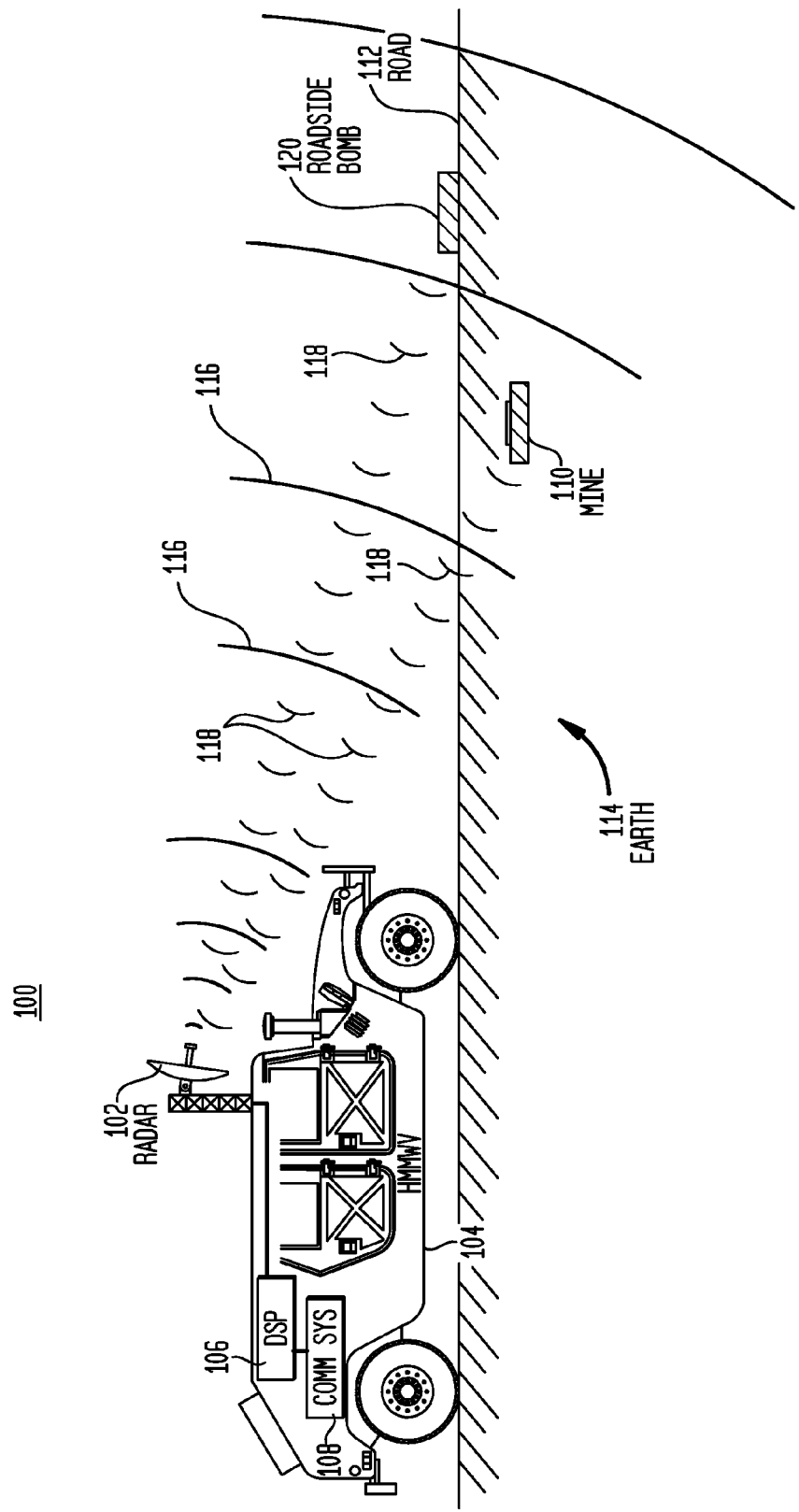
FIG. 1 is a diagram of a mobile system for detecting mines or roadside bombs in one embodiment of the system and method for eliminating spurious data in Radar Cross-Section (RCS) data.

Referring now to FIG. 1, a roadside bomb and mine detection system 100 comprises a radar 102 mounted on or to a vehicle 104 such as a High Mobility Multipurpose Wheeled Vehicle (HMMWV.) In embodiments, the radar 102 is fixed, is mounted on a rotatable swivel mount, or is mounted on a multi-axis gimbal, allowing radar 102 to be angularly rotated in any direction. In an embodiment, the motion of the radar 102 is linked to the motion of the vehicle 104, for example through a navigation unit such as a GPS receiver, an inertial measurement unit or IMU, or both. The IMU measures position changes in the orientation of the radar 102 due to the motion of the vehicle 104 and can be used to maintain orientation of the radar 102 towards a desired point or object of interest.

In another embodiment, the radar 102 comprises an electronically steerable antenna, such as a phase array antenna. The radar 102 is communicatively linked to a computing platform 106. In embodiments the computing platform 106 comprises one or more digital signal processors, microprocessors, customizable application specific processors or any other computing device suitable for processing radar cross section (RCS) data. The computing platform 106 optionally comprises a link to a communications system 108 for alerting other vehicles 104 of identified roadside bombs 120 and mines 110.

In another embodiment, a camera (not shown) is used to visually map the object of interest detected using the RCS data to a view suitable for human interpretation. The camera outputs digitized data of the image to the computing platform 106. In another embodiment, the computing platform 106 digitizes an analog input from the camera into digital frames using a digital frame grabber. In embodiments, the camera is an infrared capable camera or the camera selectively uses an image intensifier, such as a night vision tube, allowing the roadside bomb and mine detection system 100 to perform better in low light situations such as dusk or night time. In an embodiment, the output from the camera is synchronized with an output from a rotational encoder or other similar orientation identifying means in the radar 102 to correlate images from the camera with the orientation of the radar 102.

In operation, the radar 102 sends one or more radar bursts 116 at one or more frequencies or ranges of frequencies towards a suspected roadside bomb 120, a suspected buried mine 110, or an area of interest. The radar 102 receives a returned signal 118 from the earth 114, road 112, and any roadside bomb 120 or buried mine 110. The radar 102 sends the returned signal 118 to the computing platform 106. In embodiments, the radar 102 preprocesses the returned signal 118. The computing platform 106 processes the returned signal 118 and determines if the returned signal contains radar cross section (RCS) data of one or more objects of interest, such as roadside bombs 120 or buried mines 110.

Figure 2:
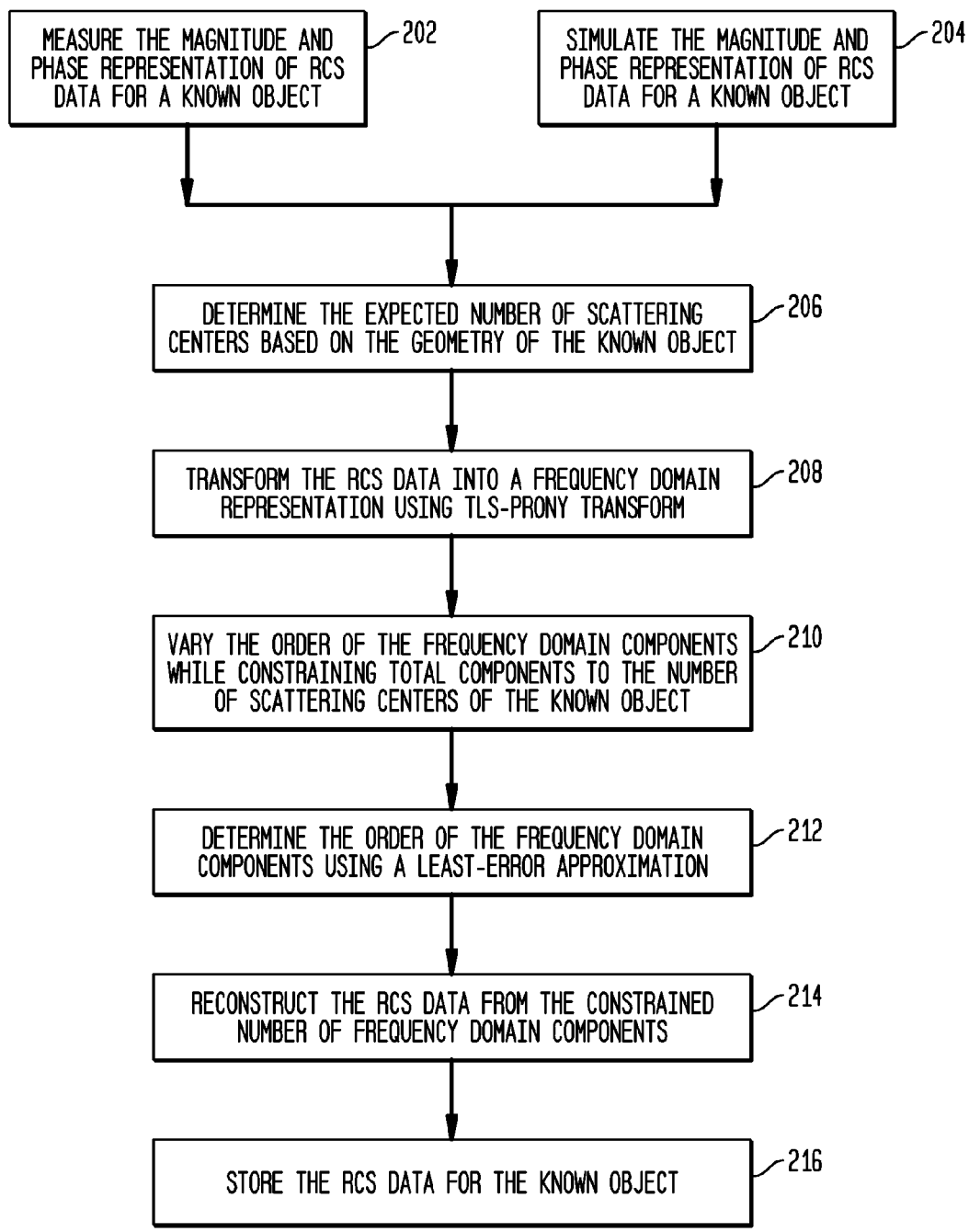
FIG. 2 is a flowchart of a process to identify scattering centers for known objects in RCS data in one embodiment of the system and method for eliminating spurious data in RCS data; and, FIG. 3 is a flowchart of a process to eliminate spurious data in one embodiment of the system and method for eliminating spurious data in RCS data.

Based on previous testing on a radar range, or through computational simulations, it is possible to predict the RCS data for a known object of interest. A returned signal 118 from a known object will contain RCS data representing the magnitude and phase changes caused by reflections of the radar bursts 116 off of the known object of interest. The magnitude and phase changes are dependent on the materials and geometries of the known object of interest, as well as the density, refractive and dispersive properties of any intervening materials in the environment between the radar 102 and the known object of interest. FIG. 2 presents a method of building a library of RCS data for known objects. The RCS data for known objects of interest can then be used in the field to dynamically remove spurious data from RCS data, as detailed in FIG. 3.

Referring now to FIG. 2, an embodiment of the process for identifying scattering centers for known objects in RCS data 200 is presented. In a first step, magnitude and phase representation of RCS data for a known object of interest is measured 202, or is simulated 204 by using a computer model of the object of interest and computing an expected RCS for one or more frequencies or ranges of frequencies to be used by the radar 102. Based on the geometry of the known object of interest, the expected number of scattering centers is determined 206. Each scattering center represents a place on the known object of interest where radar energy will be returned to the radar 102, the sum of which is the RCS data for the known object of interest.

Using a transform method, the RCS data is transformed 208 from complex or magnitude and phase representation in the power-frequency domain into multiple series of complex damped exponentials, each representing a scattering center in the RCS data, in the power-frequency domain. In one embodiment, the transform is the Prony transform that converts the original time domain RCS data into a set of scattering centers represented as damped sinusoidal components and associated coefficients. The order of the damped sinusoidal components is varied 210, for example using the TLS-Prony linear prediction order of the transform, while constraining the number of damped sinusoidal components to the number of scattering centers of the known object of interest. The order of the damped sinusoidal components is then determined 212 by finding the order that yields the least-error approximation of the power-frequency domain data. The RCS data is then reconstructed 214 using the retained damped sinusoidal components and associated coefficients that represent the RCS data from just the scattering centers of the object of interest. Once a known object of interest is isolated from any spurious data, the reconstructed RCS data for the known object of interest is stored 216 in a data store, such as a database that is searchable, as a candidate known object for the object identification using RCS data method 300.

Figure 3:
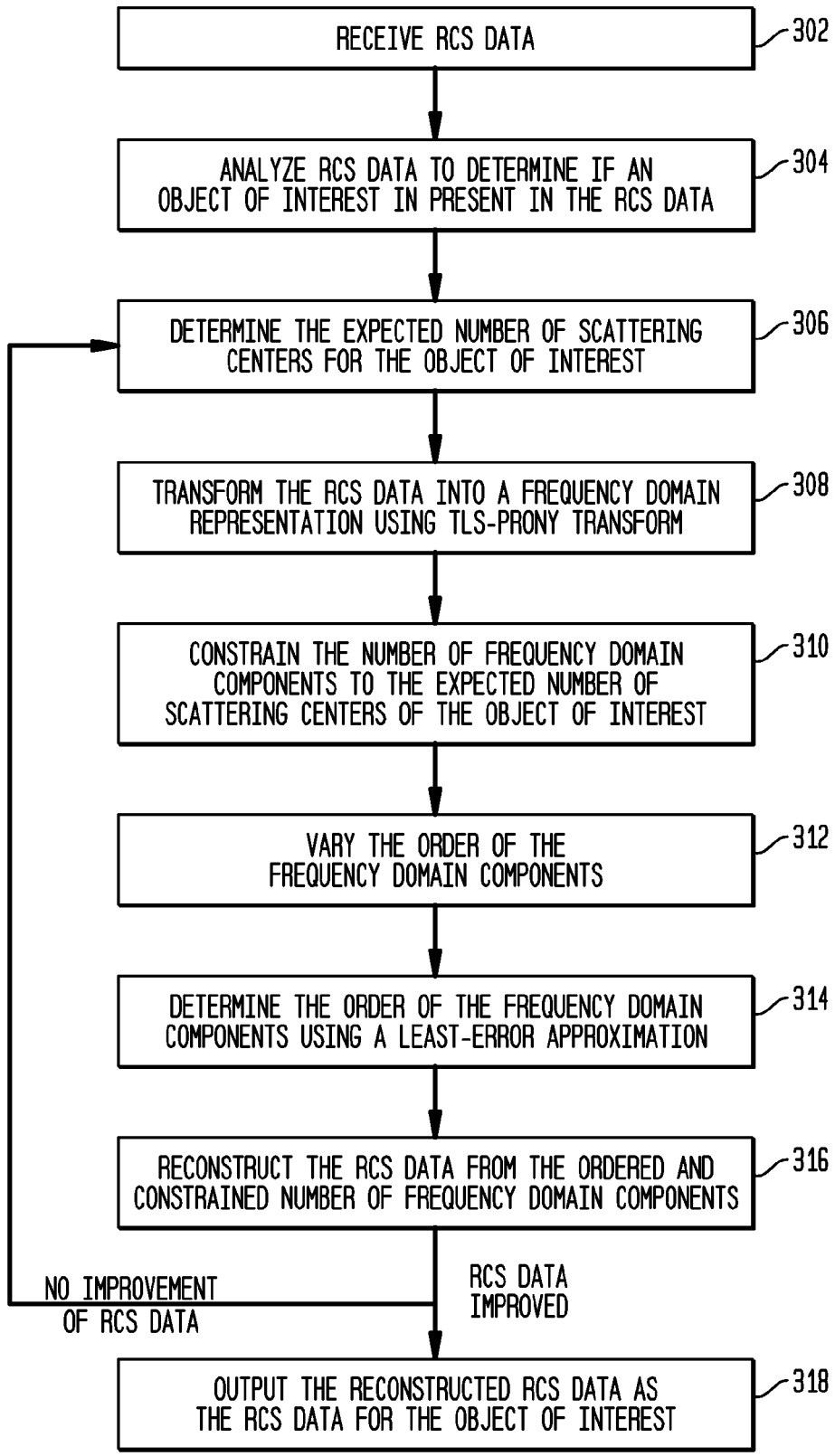

Referring now to FIG. 3, in the object identification using RCS data method 300, a returned signal 118 having RCS data is received 302. The returned signal 118 is analyzed 304 to determine if RCS data relating to an object of interest is present. In an embodiment, the returned signal 118 is analyzed 304 by comparing the RCS data with the reconstructed RCS data for known objects from the process for identifying scattering centers for known objects in RCS data 200. In this embodiment, one or more frequency components of the RCS data are compared with the database of candidate known objects to find likely matches. In embodiments, the object of interest returns a spectral signature, or a range of frequencies, magnitudes, and phase shifts, that allows the object of interest to be discerned from the rest of the environment in the returned signal 118. In an embodiment, the object of interest presents a spectral signature that is a significant returned signal 118 above the expected ambient environmental level. In an embodiment, the object of interest presents a spectral signature that is a set of returned signals 118 at frequencies and powers indicative of objects having an uncommon use of materials not normally found in the environment being scanned. In an embodiment, the object of interest presents a spectral signature that is a set of returned signals 118 at frequencies and powers indicative of objects such as roadside bombs 120, or buried mines 110.

Based on the identification of the object of interest, the computing platform 106 determines 306 the expected number of scattering centers that could be reflecting the radar bursts 116. In an embodiment, the number of scattering centers for the object of interest is determined 306 using the number of scattering centers in a candidate known object. In an embodiment, the geometry is estimated from the returned signal 118.

Using a transform method, such as TLS-Prony, the RCS data is transformed 308 within the power-frequency domain data, for example, into a set of damped exponential frequency components and associated coefficients in the case of the TLS-Prong method. Once the RCS has been transformed 308 within the power-frequency domain, the transformed RCS data is processed to remove the spurious data. The number of components is constrained 310, or reduced in number, by removing frequency components as described in more detail below. The order of the components, or scattering centers, of the power-frequency domain data is varied 312 using, for example, the TLS-Prong linear prediction order. The order of the scattering centers is determined 314 using the order that yields the least-error approximation of the power-frequency domain data. In an embodiment, the TLS-Prony method is applied to the RCS data to produce an indication of the relative power at different frequencies for decaying signals, stored as coefficients for each of the frequency terms, or frequency components. Frequency components at frequencies unrelated to the RCS data of the candidate known object can be eliminated. In another embodiment, the frequency components having the lowest order magnitude coefficients in the RCS data can be eliminated until the number of frequency components in the RCS data is the same as the number of scattering centers for the candidate known object or expected geometry. The computing platform 106 then reconstructs 316 the RCS data using the retained scattering centers and associated coefficients.

If the reconstructed RCS data produces a better resulting RCS of the object of interest, the computing platform outputs 318 the reconstructed RCS data as the RCS data for the object of interest, and the reconstructed RCS data represents the uncorrupted RCS data for the object of interest. If the reconstructed RCS data produces a worse result that the original RCS data, then the process for removing spurious data from RCS data 300 returns to step 304 to attempt to identify the object of interest using a different candidate known object or different expected number of scattering centers.

Although some of the embodiments of the disclosure are directed to roadside bombs 120, or suspected buried mine 110, the methodology and systems described above are also applicable to removing spurious data in radar cross section data of other objects of interest. For example, the expected scattering centers in the radar cross section data for aircraft, vehicles, and spacecraft can all be characterized, allowing the system and method to remove spurious data in received radar cross section data.

The embodiments of the invention shown in the drawings and described above are exemplary of numerous embodiments that may be made within the scope of the appended claims. It is contemplated that numerous other configurations of the system and method for eliminating spurious data in RCS data may be created taking advantage of the disclosed approach. It is the applicant's intention that the scope of the patent issuing herefrom will be limited only by the scope of the appended claims.

What is claimed is:

1. A method for eliminating spurious data in RCS data, comprising:
   receiving radar cross section (RCS) data;
   determining an expected number of scattering centers for an object of interest in said RCS data;
   processing said RCS data to remove a plurality of frequency components in said RCS data based at least in part upon said expected number of scattering centers; and
   reconstructing said RCS data without said plurality of frequency components to produce a reconstructed RCS data.

2. The method of claim 1, further comprising:
   identifying said object of interest in said RCS data.

3. The method of claim 2, wherein said operation of identifying is selected from the group consisting of comparing said RCS data with RCS data for known objects, identifying a spectral signature indicative of an object having materials identified with mines and bombs, and identifying a spectral signature of an object having a geometry identified with mines and bombs.

4. The method of claim 1, wherein said operation of processing further comprises:
   transforming said RCS data into a set of damped frequency components and coefficients using a TLS-Prong transform.

5. The method of claim 1, wherein said operation of processing further comprises:
   constraining said set of damped frequency components and coefficients to said expected number of scattering centers in said object of interest.

6. The method of claim 1, wherein said operation of processing further comprises:
   varying an order of said set of damped frequency components and coefficients until said order yields a least-error approximation of said set of damped frequency components and coefficients.

7. The method of claim 1, further comprising:
   outputting said reconstructing RCS data as said RCS data of said object of interest.

8. A method for identifying scattering centers for known objects in RCS data, comprising:
   finding magnitude and phase representation of RCS data for a known object;
   determining an expected number of scattering centers for said known object based on a geometry of said known object;
   transforming said RCS data into a frequency domain representation;
   removing a plurality of frequency components in said RCS data based at least in part upon said expected number of scattering centers;
   reconstructing said RCS data without said plurality of frequency components to produce a reconstructed RCS data; and
   storing said reconstructed RCS data.

9. The method of claim 8, wherein said operation of finding is selected from the group consisting of measuring, modeling, estimating, and simulating.

10. The method of claim 8, wherein said operation of transforming further comprises:
    transforming said RCS data into a set of damped frequency components and coefficients using a TLS-Prong transform.

11. The method of claim 8, wherein said operation of removing further comprises:
    constraining said set of damped frequency components and coefficients to said expected number of scattering centers in said known object.

12. The method of claim 11, wherein said operation of removing further comprises:
    ordering said set of damped frequency components using a TLS-Prong linear prediction order.

13. The method of claim 11, wherein said operation of removing further comprises:
    varying an order of the damped frequency components and coefficients until said order yields a least-error approximation of the set of damped frequency components and coefficients.

14. An object detection system, comprising:
a radar that beams a signal and receives a return signal of radar cross section (RCS) data from an object of interest; and
a signal processor, adapted to:
receive said radar cross section (RCS) data;
determine an expected number of scattering centers for said object of interest in said RCS data;
process said RCS data to remove a plurality of frequency components in said RCS data based at least in part upon said expected number of scattering centers; and
reconstruct said RCS data without said plurality of frequency components to produce a reconstructed RCS data.

15. The system of claim 14, wherein said signal processor is further adapted to:
identify said object of interest in said RCS data;
transform said RCS data into a set of damped frequency components and coefficients using a TLS-Prong transform;
constrain said set of damped frequency components and coefficients to said expected number of scattering centers in said object of interest; and
output said reconstructing RCS data as said RCS data of said object of interest.

16. The system of claim 15, wherein said identifying is performed using a data store of RCS data for a plurality of previously characterized objects of interest.

17. The system of claim 14, wherein said radar and said signal processor are mounted to a vehicle.

18. The system of claim 14, further comprising:
a camera for displaying a visual image of said object of interest.

19. The system of claim 14, further comprising:
a communications system for relaying information regarding said object of interest.

20. The system of claim 14, wherein said radar is an electronically steerable radar.

* * * * *

UNITED STATES PATENT AND TRADEMARK OFFICE
CERTIFICATE OF CORRECTION

PATENT NO. : 8,242,952 B1
APPLICATION NO. : 12/694721
DATED : August 14, 2012
INVENTOR(S) : Samuel Allan Barr It is certified that error appears in the above-identified patent and that said Letters Patent is hereby corrected as shown below:

Title Page, Item (57) in the Abstract, third to last line: "using a TLS-Prong linear prediction order" should read -- using a TLS-Prony linear prediction order --

Column 5, Line 2: "TLS-Prong method." should read -- TLS-Prony method. --

Column 5, Line 9: "example, the TLS-Prong linear prediction order." should read -- example, the TLS-Prony linear prediction order --

Claim 4, Column 6, Line 13: "components and coefficients using a TLS-Prong trans-" should read -- components and coefficients using TLS-Prony trans- --

Claim 10, Column 6, Line 51: "components and coefficients using a TLS-Prong trans-" should read -- components and coefficients using TLS-Prony trans- --

Claim 12, Column 6, Line 61: "TLS-Prong linear prediction order" should read -- TLS-Prony linear prediction order --

Claim 15, Column 7, Line 19: "components and coefficients using a TLS-Prong trans-" should read -- components and coefficients using TLS-Prony trans- --

Signed and Sealed this
Eighth Day of January, 2013

David J. Kappos
*Director of the United States Patent and Trademark Office*